March 26, 1946.    J. E. SMITH    2,397,382
LOCKING DEVICE
Filed June 19, 1944    2 Sheets-Sheet 1

INVENTOR.
JUSTICE E. SMITH
BY
ATTORNEYS

March 26, 1946. J. E. SMITH 2,397,382
LOCKING DEVICE
Filed June 19, 1944 2 Sheets-Sheet 2

INVENTOR.
JUSTICE E. SMITH
BY
ATTORNEYS

Patented Mar. 26, 1946

2,397,382

UNITED STATES PATENT OFFICE 2,397,382

LOCKING DEVICE

Justice E. Smith, Detroit, Mich.

Application June 19, 1944, Serial No. 541,065

3 Claims. (Cl. 287—126)

The invention relates to locking devices and refers more particularly to devices for locking to each other driving and driven members, either or both of which may be rotary.

The invention has for one of its objects to provide an improved locking device which is constructed to provide for locking engagement between the driving and driven members at a plurality of angularly spaced points.

The invention has for another object to provide a locking device in which the forces resulting from the locking engagement counterbalance.

The invention has for a further object to provide a locking device which is so constructed that the means for effecting the locking action maintains the driving and driven members in axial alignment.

Figure 1:
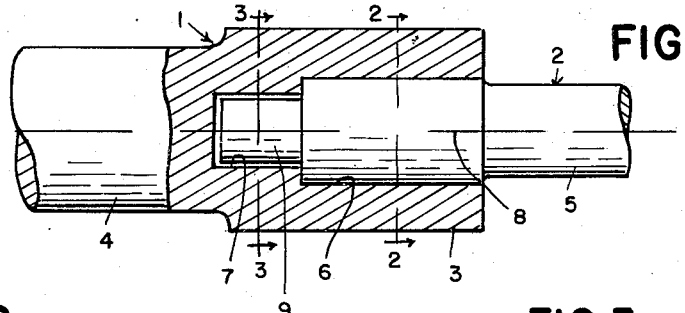
Figure 2:
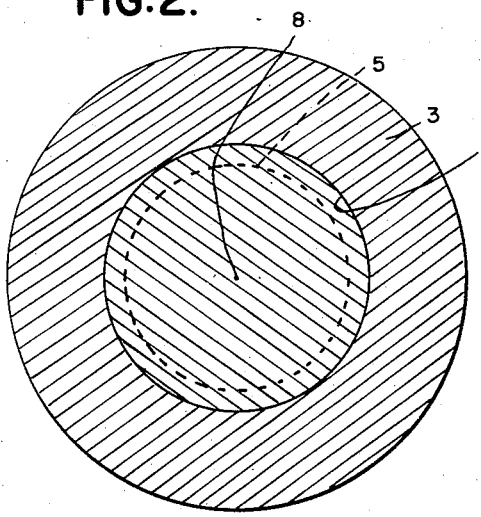
Figure 3:
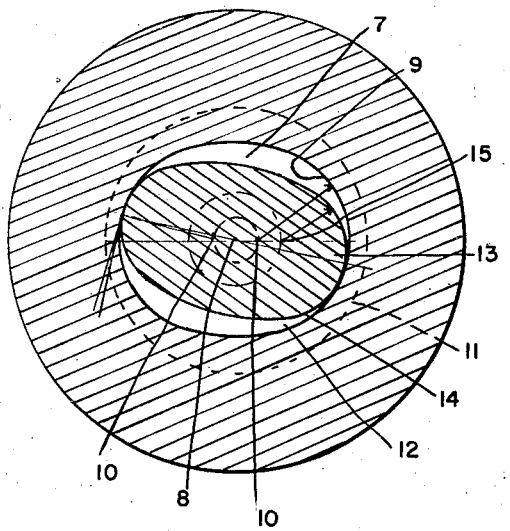
Figure 6:
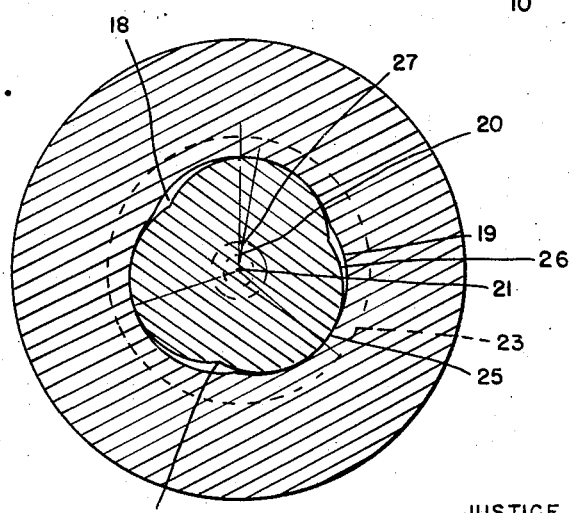
Figure 4:
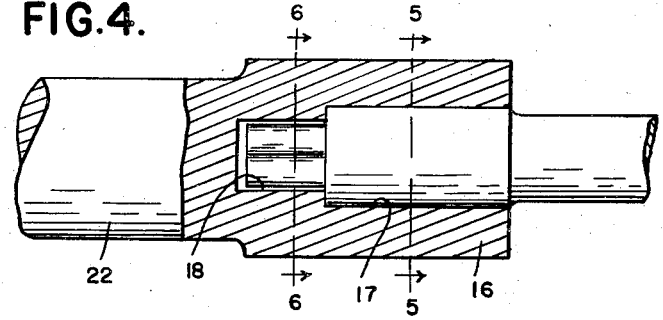
Figure 5:
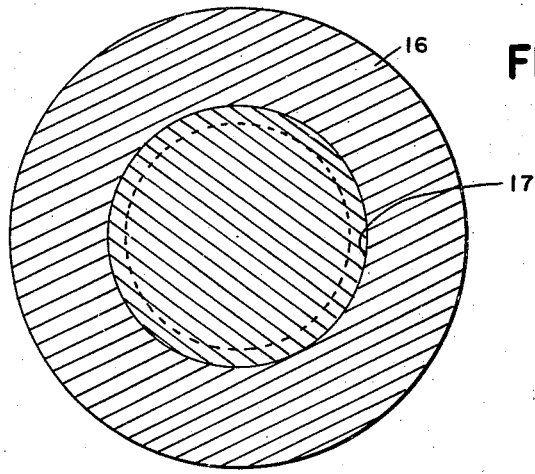
Figure 7:
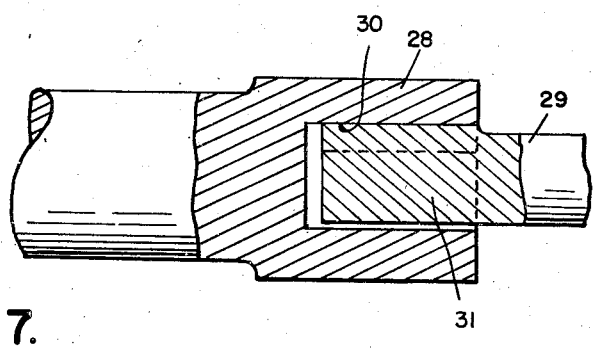

These and other objects of the invention will become apparent from the following description, taken in connection with the accompanying drawings, in which Figure 1 is an elevation, partly in section, of a locking device embodying the invention;

Figures 2 and 3 are enlarged cross sections on the lines 2—2 and 3—3, respectively, of Figure 1;

Figure 4 is a view similar to Figure 1 showing a modification;

Figures 5 and 6 are enlarged cross sections on the lines 5—5 and 6—6, respectively, of Figure 4;

Figure 7 is a view similar to Figure 4 showing another modification.

The locking device is applicable to various structures for driving and driven members, either or both of which may be rotary, such as machine tools, drives such as electric motor drives, and the like.

As illustrated in Figures 1, 2 and 3, the locking device is designed for use with a machine tool in which 1 is the holder and 2 the tool, both of which are constructed to cooperate in a manner to form a locking device between the holder and tool. In detail, the holder has the socket 3 and the shank 4 for securement, for example, to the rotary spindle of a machine. The tool may be one of a number of different types of cutters and has the shank 5. The socket 3 and shank 5 are constructed to form a locking device.

As illustrated, the socket has the recess 6 of circular cross section and the adjacent recess 7 of generally elliptical cross section, the latter being at the inner end of the socket. The center of the recess 6 and the center of the recess 7, which latter is located at the intersection of the major and minor axes of the recess 7, register with the axis 8 of the socket and the holder.

The recess 6, as shown, is cylindrical and provides a cylindrical bearing surface concentric with the axis of the socket. The recess 7 has at the ends of its major axis the arcuate bearing surfaces 9 which, as shown, are substantially semi-cylindrical and have their centers 10 spaced equally from the axis 8. The shank of the tool has the portion 11 of circular cross section and the adjacent portion 12 of generally elliptical cross section, the latter being at the end of the tool shank. The center of the portion 11 and also the center of the portion 12, which latter is located at the intersection of the major and minor axes of the portion 12, register with the axis of the shank which registers with the axis 8 of the socket when the shank is located in the socket. The portion 11, as shown, is cylindrical and provides a cylindrical bearing surface and the diameter of the portion 11 is substantially the same as that of the recess 6 to fit the latter and to thereby secure substantially axial alignment of the holder and tool. The portion 12 has at the ends of its major axis the eccentric parts 13 which provide at their outer edges arcuate bearing surfaces 14 which, as shown, are substantially semi-cylindrical and have their centers 15 spaced equally from the axis of the tool shank and also the axis 8 of the holder and tool assembly.

The dimension of the major axis of the recess 7 of the socket is less than the diameter of the recess 6 of the socket and the dimension of the major axis of the portion 12 of the tool shank is less than the diameter of the portion 11 of the tool shank to provide for insertion of the tool shank into the socket. The radii of the eccentric bearing surfaces 14 of the tool shank are smaller than the radii of the eccentric bearing surfaces 9 of the socket and, in addition, the distance between the eccentric bearing surfaces 14 of the tool shank and its axis is slightly less than the distance between the eccentric bearing surfaces 9 of the socket and its axis. Furthermore, the distance between the centers 10 of the eccentric bearing surfaces 9 and the axis 8 of the holder is less than the distance between the centers 15 of the eccentric bearing surfaces 14 and the axis 8 of the holder so that when the tool is assembled with the holder and the two are relatively rotated in either direction the eccentric bearing surfaces 14 have a wedging locking action with the eccentric bearing surfaces 9, the first mentioned bearing surfaces wedging against the second mentioned bearing surfaces within the angle of friction. The angle is preferably between three and nine degrees.

In the modification illustrated in Figures 4, 5 and 6, the socket 16 of the holder has the recess 17 of circular cross section and the adjacent recess 18 at the inner end of the socket. The recess 17, as shown, is cylindrical and provides a cylindrical bearing surface concentric with the axis of the socket. The recess 18 has the angularly spaced arcuate bearing surfaces 19, the middles of which are spaced 120 degrees apart. The arcuate bearing surfaces 19 form parts of cylindrical surfaces and have their centers 20 spaced equally from the axis 21 of the socket and the holder. The shank 22 of the tool has the portion 23 of circular cross section and the adjacent portion 24 at the end of the tool shank. The portion 23, as shown, is cylindrical and provides a cylindrical bearing surface and the diameter of the portion 23 is substantially the same as that of the recess 17 to fit the latter and to thereby secure substantially axial alignment of the holder and tool. The portion 24 is formed with the angularly spaced eccentric parts 25, the middles of which are spaced 120 degrees apart. The eccentric parts provide at their outer edges arcuate bearing surfaces 26 which, as shown, are portions of cylindrical surfaces and the centers 27 of these surfaces are spaced equally from the axis of the tool shank and also the axis 21 of the holder and tool assembly. The maximum radial dimension of the recess 18 of the socket is less than the radius of the recess 17 of the socket and the maximum radial dimension of the portion 24 of the tool shank is less than the radius of the portion 23 of the tool shank to provide for insertion of the tool shank into the socket. The radii of the eccentric bearing surfaces 26 of the tool shank are smaller than the radii of the eccentric bearing surfaces 19 of the socket and also the distance between the eccentric bearing surfaces 26 of the tool shank and its axis is slightly less than the distance between the eccentric bearing surfaces 19 of the socket and its axis. Furthermore, the distance between the centers of the eccentric bearing surfaces 19 and the axis of the holder is less than the distance between the centers of the eccentric bearing surfaces 26 and the axis of the holder so that when the tool is assembled with the holder and the two are relatively rotated in either direction the eccentric bearing surfaces 26 have a wedging locking action within the angle of friction with the eccentric bearing surfaces 19.

Either or both of the above modifications may be constructed to provide the tool shank with the socket for receiving the holder. Also they may be constructed to provide eccentric bearing surfaces at both ends of the cylindrical bearing surfaces of the holder and socket.

With the above construction of three interengaging equally angularly spaced eccentric bearing surfaces upon both the holder and tool, as illustrated particularly in Figure 6, the holder and tool are centered with respect to each other to have registering axes. As a result, and as shown in Figure 7, the cylindrical bearing surfaces of the socket 28 of the holder and of the shank 29 of the tool are omitted. Instead, the socket 28 has the recess 30 and the shank 29 has the portion 31 which are formed respectively in the same manner as the recess 17 and the portion 24 illustrated particularly in Figure 6. With this construction, it will be seen that the holder and tool may be effectively locked together in centered relation to each other.

What I claim as my invention is:

1. A locking device comprising a holder having a concentric bearing surface and a plurality of angularly spaced eccentric bearing surfaces at an end of said first mentioned bearing surface, and a tool having a concentric bearing surface fitting said first mentioned concentric bearing surface and a plurality of angularly spaced eccentric bearing surfaces corresponding in number to said first mentioned eccentric bearing surfaces and wedging thereagainst at an angle substantially between three and nine degrees, said eccentric bearing surfaces being symmetrically arranged with respect to planes passing through their middles and the axes of said holder and tool.

2. A device for locking driving and driven members to each other comprising a holder on one member having a socket provided with a concentric bearing surface and a plurality of substantially co-extensive eccentric bearing surfaces spaced angularly around said socket and having their centers spaced equally from the center of said first mentioned concentric bearing surface, and means on the other member extending within said socket and having a concentric bearing surface fitting said first mentioned concentric bearing surface and a plurality of eccentric bearing surfaces corresponding in number to said second mentioned bearing surfaces and wedging thereagainst at an angle substantially between three and nine degrees, said eccentric bearing surfaces being symmetrically arranged with respect to planes passing through their middles and the axes of said holder and tool.

3. A locking device comprising a holder having a recess of circular cross section concentric with the axis of said holder and a second recess having a plurality of angularly spaced eccentric bearing surfaces having their centers spaced equally from the center of said first mentioned recess, and a tool having a shank provided with a portion of circular cross section concentric with the axis of said shank and a second portion having angularly spaced eccentric bearing surfaces with their centers spaced equally from the center of said first mentioned portion, all of said eccentric bearing surfaces being symmetrically arranged with respect to planes passing through their middles and the axes of said holder and tool, said first mentioned portion fitting said first mentioned recess and said second mentioned bearing surfaces having wedging locking action with said first mentioned bearing surfaces.

JUSTICE E. SMITH.